United States Patent
Nakano et al.

(10) Patent No.: US 12,066,207 B2
(45) Date of Patent: Aug. 20, 2024

(54) BLOWER AND WITH CONTROLLER CONTROLLING A MOTOR

(71) Applicant: DAIKIN INDUSTRIES, LTD., Osaka (JP)

(72) Inventors: Akihiro Nakano, Osaka (JP); Yoshinori Takayama, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 18/384,478

(22) Filed: Oct. 27, 2023

(65) Prior Publication Data

US 2024/0053048 A1    Feb. 15, 2024

Related U.S. Application Data

(63) Continuation of application No. PCT/JP2022/019131, filed on Apr. 27, 2022.

(30) Foreign Application Priority Data

Apr. 28, 2021 (JP) .................................. 2021-076883

(51) Int. Cl.
   *F24F 11/77* (2018.01)
   *F24F 1/0018* (2019.01)
   (Continued)

(52) U.S. Cl.
   CPC ............ *F24F 11/77* (2018.01); *F24F 1/0018* (2013.01); *F24F 11/74* (2018.01); *F24F 2110/10* (2018.01)

(58) Field of Classification Search
   CPC ........ F24F 11/74; F24F 11/77; F24F 2140/00; F24F 1/0018; F24F 2110/10
   See application file for complete search history.

(56) References Cited

U.S. PATENT DOCUMENTS

5,590,539 A * 1/1997 Marohl ..................... F28F 1/00
                                                              62/468
2021/0140663 A1* 5/2021 Pourgol-Mohammad ...................
                                                              F24F 11/63

FOREIGN PATENT DOCUMENTS

JP      2014-110678 A     6/2014
JP      2017-67046 A      4/2017
(Continued)

OTHER PUBLICATIONS

International Preliminary Report on Patentability and English translation of the Written Opinion of the International Searching Authority for International Application No. PCT/JP2022/019131, dated Nov. 9, 2023.

(Continued)

*Primary Examiner* — Jerry-Daryl Fletcher
*Assistant Examiner* — Daniel C Comings
(74) *Attorney, Agent, or Firm* — Birch, Stewart, Kolasch & Birch, LLP

(57) ABSTRACT

A blower includes a motor with variable rotational speed, and a first controller. The motor has a shaft supported by a bearing with a lubricant sealed in. The first controller rotationally drives the motor. The first controller executes first control to decrease the rotational speed of the motor when a first temperature, which is the temperature of the bearing, decreases during operation in which the motor is rotated in a predetermined low rotational speed range. This air conditioner includes: an indoor unit having the blower, a temperature sensor that measures the first temperature, and a heat exchanger; and a second controller that controls the blower to perform air conditioning operation in a space to be air-conditioned in which the indoor unit is installed.

20 Claims, 7 Drawing Sheets

(51) Int. Cl.
  *F24F 11/74* (2018.01)
  *F24F 110/10* (2018.01)

(56) References Cited

FOREIGN PATENT DOCUMENTS

| | | |
|---|---|---|
| KR | 10-2017-0002996 A | 1/2017 |
| WO | WO-2010097537 A1 * | 9/2010 ............. F25B 43/02 |
| WO | WO-2016039890 A2 * | 3/2016 ............. F04D 17/16 |

OTHER PUBLICATIONS

International Search Report (PCT/ISA/210) issued in PCT/JP2022/019131 mailed on Jul. 19, 2022.

Written Opinion (PCT/ISA/237) issued in PCT/JP2022/019131 mailed on Jul. 19, 2022.

* cited by examiner

BLOWER AND WITH CONTROLLER CONTROLLING A MOTOR

This application is a Continuation of PCT International Application No. PCT/JP2022/019131, filed on Apr. 27, 2022, which claims priority under 35 U.S.C. § 119(a) to Patent Application No. JP 2021-076883, filed in Japan on Apr. 28, 2021, all of which are hereby expressly incorporated by reference into the present application.

TECHNICAL FIELD

The present description relates to a blower and an air conditioner.

BACKGROUND ART

A blower that rotates a fan using a motor is known.

Patent Literature 1 (JP 2017-067046 A) discloses a blower having a shaft (motor shaft) and a bearing supporting the motor shaft, the blower including: a tubular sleeve that is disposed between the bearing and the end of the motor shaft and through which the motor shaft passes; a tubular fan boss that is disposed between the sleeve and the end of the motor shaft and through which the motor shaft passes; and a fastening member disposed at the end of the motor shaft. The sleeve and the fan boss are sandwiched between the bearing and the fastening member.

SUMMARY

A blower includes a motor with variable rotational speed and a first control unit. The motor has a shaft supported by a bearing with a lubricant sealed in. The first control unit rotationally drives the motor. The first control unit executes first control to decrease the rotational speed of the motor when a first temperature decreases during operation in which the motor is rotated in a predetermined low rotational speed range, the first temperature being a temperature of the bearing or a temperature around the bearing.

DESCRIPTION OF EMBODIMENT

First Embodiment

(1) Overall Configuration

A blower according to the present disclosure is not limited in application, but is used, for example, in the utilization unit of an air conditioner that uses a vapor compression refrigeration cycle. Here, an air conditioner 1 in which a blower 100, which is an example of the blower according to the present disclosure is used, will be described with reference to the drawings.

Hereinafter, the air conditioner 1 will be first described, and then details of the blower will be described. Note that in the following, the same reference signs are given to the same or corresponding configurations between an embodiment and each modification, and the description thereof is appropriately omitted.

(2) Detailed Configuration

(2-1) Configuration of Air Conditioner

Figure 1:
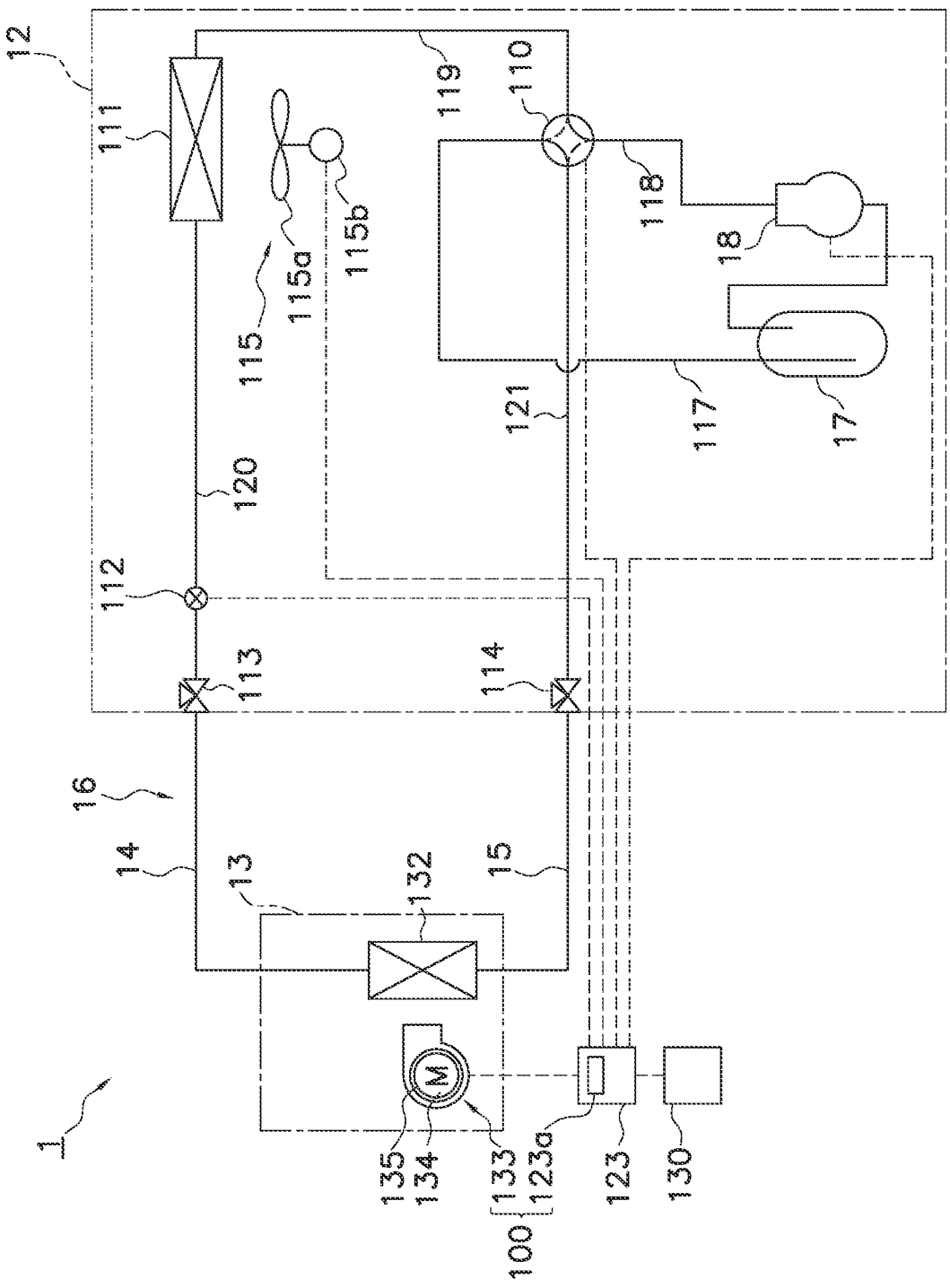
FIG. 1 is a schematic configuration diagram of an air conditioner 1 having a blower 100.

FIG. 1 is a schematic configuration diagram of the air conditioner 1 having the blower 100.

The air conditioner 1 performs air conditioning operation (cooling operation and heating operation) of a space to be air-conditioned, by performing a vapor compression refrigeration cycle. Examples of the space to be air-conditioned include spaces in buildings such as office buildings, commercial facilities, and residences.

As illustrated in FIG. 1, the air conditioner 1 mainly has a heat source unit 12, a utilization unit 13, a liquid-refrigerant connection pipe 14, a gas-refrigerant connection pipe 15, a control unit 123, and a remote controller 130.

Note that in FIG. 1, the air conditioner 1 has the single utilization unit 13, but may alternatively have a plurality of utilization units 13 that are connected in parallel with the heat source unit 12 by the refrigerant connection pipes 14 and 15. Alternatively, the air conditioner 1 may have a plurality of heat source units 12. Alternatively, the air conditioner 1 may be an integrated air conditioner in which the heat source unit 12 and the utilization unit 13 are formed integrally with each other.

(2-1-1) Heat Source Unit

The heat source unit 12 mainly has an accumulator 17, a compressor 18, a flow direction switching mechanism 110, a heat source-side heat exchanger 111, an expansion mechanism 112, a liquid-side shutoff valve 113, a gas-side shutoff valve 114, and a heat source-side fan 115.

(2-1-2) Utilization Unit

The utilization unit 13 mainly has a utilization-side heat exchanger 132 and a utilization-side fan 133.

(2-1-3) Liquid-Refrigerant Connection Pipe and Gas-Refrigerant Connection Pipe The liquid-refrigerant connection pipe 14 and the gas-refrigerant connection pipe 15 each interconnect the heat source unit 12 and the utilization unit 13. In the air conditioner 1, the heat source unit 12 and the utilization unit 13 are connected through the refrigerant connection pipes 14 and 15 to constitute a refrigerant circuit 16.

(2-1-4) Control Unit

The control unit 123 controls the devices constituting the heat source unit 12 and the utilization unit 13 and performs air conditioning operation.

The control unit 123 has a fan motor control unit 123a. The fan motor control unit 123a rotationally drives a fan motor 134 and executes first control described later. The control unit 123 instructs the fan motor control unit 123a on a predetermined rotational speed range or a required rotational speed. Details of the fan motor control unit 123a and the first control will be described later. The control unit 123 is an example of a second control unit.

In the control unit 123, fan taps for changing the rotational speed of the fan motor 134 in stages are set. In the air conditioner 1, the fan taps are set in three stages: H-tap that rotates the fan motor 134 in a high rotational speed range to generate strong wind; M-tap that rotates the fan motor 134 in a medium rotational speed range to generate weak wind; and L-tap that rotates the fan motor 134 in a low rotational speed range to generate a breeze. Each of the rotational speed ranges has an upper limit rotational speed and a lower limit rotational speed. The upper limit rotational speed and the lower limit rotational speed of each rotational speed range are recorded in a storage device described later. Note that the number of the fan taps is not limited to three stages, and may be two or four or more, as long as there are multiple fan taps.

The control unit 123 is configured so as to be capable of receiving various signals transmitted from the remote controller 130 for the user to operate the air conditioner 1. The various signals transmitted from the remote controller include signals indicating start/stop of the air conditioning operation, signals indicating airflow (fan tap), and signals related to various settings. The control unit 123 controls the devices of the heat source unit 12 and the utilization unit 13 on the basis of various signals transmitted from the remote controller 130. The user can select the rotational speed range of the fan motor 134 by selecting a fan tap through the remote controller 130. When a fan tap is selected through the remote controller 130, the control unit 123 instructs the fan motor control unit 123a on a rotational speed range preset according to the fan tap.

The control unit 123 and the fan motor control unit 123a are implemented by a computer. The control unit 123 and the fan motor control unit 123a include a control calculation device and a storage device (both not illustrated). A processor such as a CPU or a GPU can be used for the control calculation device. The control calculation device reads programs and various setting values stored in the storage device, and performs predetermined calculation processing according to the programs and various setting values. Further, the control calculation device can write the calculation results in the storage device and read information stored in the storage device according to the programs.

(2-1-5) Operation of Air Conditioner

Next, the cooling operation and the heating operation among the air conditioning operation executed by the control unit 123 will be described. Note that although detailed description is omitted, the control unit 123 may be capable of performing, in addition to the cooling operation and the heating operation, well-known air conditioning operations, such as weak cooling and dehumidifying operation in which indoor air is dehumidified while relatively weak cooling is performed, reheat dehumidifying operation in which dehumidification is performed without lowering the temperature of the space to be air-conditioned, by heating with a reheater while cooling and dehumidifying air, or thermo-off operation in which the operation of the compressor 18 is stopped.

(Cooling Operation)

Upon receiving an instruction to start the cooling operation through the remote controller 130, the control unit 123 controls the operation of the flow direction switching mechanism 110 to switch the state of the refrigerant circuit 16 to a state in which the heat source-side heat exchanger 111 functions as a radiator (condenser) for the refrigerant and the utilization-side heat exchanger 132 functions as an evaporator for the refrigerant. Specifically, the control unit 123 controls the operation of the flow direction switching mechanism 110 to cause a suction pipe 117, which is connected to the suction side of the compressor 18, to communicate with a second gas refrigerant pipe 121 that connects the flow direction switching mechanism 110 and the gas-side shutoff valve 114. The control unit 123 also controls the operation of the flow direction switching mechanism 110 to cause a discharge pipe 118, which is connected to the discharge side of the compressor 18, to communicate with a first gas refrigerant pipe 119 that connects the flow direction switching mechanism 110 and the gas side of the heat source-side heat exchanger 111 (see the solid line in the flow direction switching mechanism 110 in FIG. 1). During the cooling operation, the control unit 123 operates the compressor 18, the heat source-side fan 115, and the utilization-side fan 133. In addition, during the cooling operation, the control unit 123 adjusts, on the basis of the measurement values and the like of various sensors, the rotational speed range or required rotational speed of the compressor 18, a fan motor 115a of the heat source-side fan 115 and the fan motor 134 of the utilization-side fan 133, and the opening degree of an electronic expansion valve exemplifying the expansion mechanism 112 to a predetermined opening degree.

When the control unit 123 controls the operation of the various devices of the air conditioner 1, a low-pressure gas refrigerant in the refrigeration cycle is sucked into the compressor 18, compressed to a high pressure in the refrigeration cycle, and then discharged from the compressor 18. The high-pressure gas refrigerant discharged from the compressor 18 is sent to the heat source-side heat exchanger 111 through the flow direction switching mechanism 110. The high-pressure gas refrigerant sent to the heat source-side heat exchanger 111 radiates heat through heat exchange with air serving as a cooling source supplied by the heat source-side fan 115 in the heat source-side heat exchanger 111 functioning as a radiator for the refrigerant, and becomes a high-pressure liquid refrigerant. The high-pressure liquid refrigerant obtained by radiating heat in the heat source-side heat exchanger 111 is sent to the expansion mechanism 112 through a liquid refrigerant pipe 120. In the expansion mechanism 112, the high-pressure liquid refrigerant is decompressed into a low-pressure gas-liquid two-phase state. The low-pressure gas-liquid two-phase refrigerant obtained by decompression in the expansion mechanism 112 is sent to the utilization-side heat exchanger 132 through the liquid refrigerant pipe 120, the liquid-side shutoff valve 113, and the liquid-refrigerant connection pipe 14. The low-pressure gas-liquid two-phase refrigerant sent to the utilization-side heat exchanger 132 evaporates through heat exchange with air in the space to be air-conditioned which is supplied by the utilization-side fan 133 in the utilization-side heat exchanger 132 functioning as an evaporator for the refrigerant. The air cooled through heat exchange with the refrigerant is supplied to the space to be air-conditioned, to cool the space. The low-pressure gas refrigerant obtained by evaporation in the utilization-side heat exchanger 132 is sucked into the compressor 18 again through the gas-refrigerant connection pipe 15, the gas-side shutoff valve 114, the flow direction switching mechanism 110, and the accumulator 17.

(Heating Operation)

Upon receiving an instruction to start the heating operation through the remote controller 130, the control unit 123 controls the operation of the flow direction switching mechanism 110 to switch the state of the refrigerant circuit 16 to a state in which the heat source-side heat exchanger 111 functions as an evaporator for the refrigerant and the utilization-side heat exchanger 132 functions as a radiator (condenser) for the refrigerant. Specifically, the control unit 123 controls the operation of the flow direction switching mechanism 110 to cause the suction pipe 117 to communicate with the first gas refrigerant pipe 119 and cause the discharge pipe 118 to communicate with the second gas refrigerant pipe 121 (see the broken line in the flow direction switching mechanism 110 in FIG. 1). During the heating operation, the control unit 123 operates the compressor 18, the heat source-side fan 115, and the utilization-side fan 133. In addition, during heating operation, the control unit 123 adjusts, on the basis of the measurement values and the like of various sensors, the rotational speed range or required rotational speed of the compressor 18, the fan motor 115*a* of the heat source-side fan 115 and the fan motor 134 of the utilization-side fan 133, and the opening degree of the electronic expansion valve exemplifying the expansion mechanism 112 to a predetermined opening degree.

When the control unit 123 controls the operation of the various devices of the air conditioner 1 in this manner, the low-pressure gas refrigerant in the refrigeration cycle is sucked into the compressor 18, compressed to a high pressure in the refrigeration cycle, and then discharged from the compressor 18. The high-pressure gas refrigerant discharged from the compressor 18 is sent to the utilization-side heat exchanger 132 through the flow direction switching mechanism 110, the gas-side shutoff valve 114, and the gas-refrigerant connection pipe 15. The high-pressure gas refrigerant sent to the utilization-side heat exchanger 132 radiates heat through heat exchange with air in the space to be air-conditioned which is supplied by the utilization-side fan 133 in the utilization-side heat exchanger 132 functioning as a radiator (condenser) for the refrigerant, and becomes a high-pressure liquid refrigerant. The air heated through heat exchange with the refrigerant is supplied to the space to be air-conditioned, to heat the space. The high-pressure liquid refrigerant obtained by radiating heat in the utilization-side heat exchanger 132 is sent to the expansion mechanism 112 through the liquid-refrigerant connection pipe 14, the liquid-side shutoff valve 113, and the liquid refrigerant pipe 120. The refrigerant sent to the expansion mechanism 112 is decompressed by the expansion mechanism 112 into a low-pressure gas-liquid two-phase state. The low-pressure gas-liquid two-phase refrigerant obtained by decompression in the expansion mechanism 112 is sent to the heat source-side heat exchanger 111 through the liquid refrigerant pipe 120. The low-pressure gas-liquid two-phase refrigerant sent to the heat source-side heat exchanger 111 evaporates through heat exchange with air serving as a heating source supplied by the heat source-side fan 115 in the heat source-side heat exchanger 111 functioning as an evaporator for the refrigerant, and becomes a low-pressure gas refrigerant. The low-pressure refrigerant obtained by evaporation in the heat source-side heat exchanger 111 is sucked into the compressor 18 again through the flow direction switching mechanism 110 and the accumulator 17.

(2-2) Configuration of Blower

Figure 2:
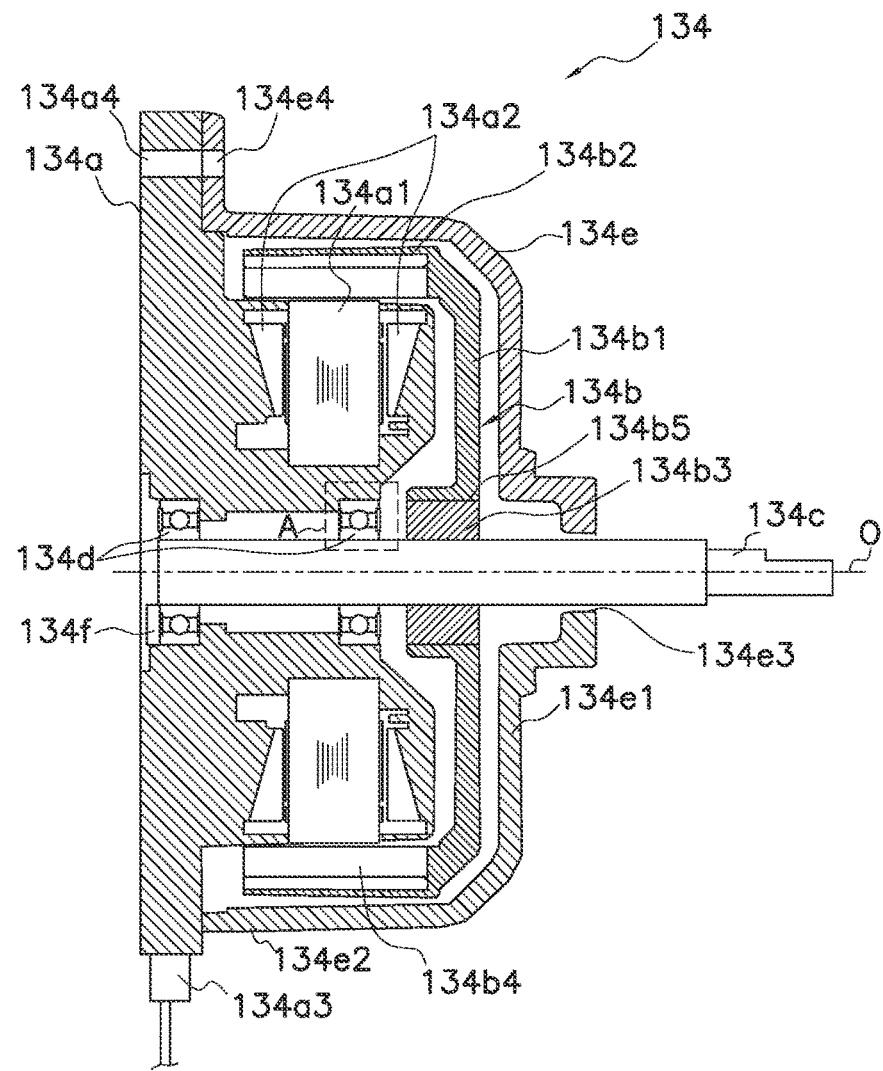
FIG. 2 is a sectional view of a fan motor 134.

The blower 100 includes the utilization-side fan 133 and the fan motor control unit 123*a*. The utilization-side fan 133 mainly has the fan motor 134 and a fan rotor 135. FIG. 2 is a sectional view of the fan motor 134.

(2-2-1) Fan Motor and Fan Rotor

The fan motor 134 rotationally drives the fan rotor 135. The fan motor 134 is an outer rotor motor. The fan motor 134 is an inverter motor with variable rotational speed equipped with an inverter (not illustrated). The rotational speed of the fan motor 134 is controlled by the required rotational speed of the control unit 123 or the fan motor control unit 123*a*. The fan motor 134 mainly has a stator 134*a*, a rotor 134*b*, a shaft 134*c*, two bearings 134*d*, a casing 134*e*, and a temperature sensor 134*f*. The fan motor 134 exemplifies a motor.

The stator 134*a* is a substantially tubular member, and mainly has a cylindrical stator core 134*a*1 that is a magnetic body and a stator coil 134*a*2 that is wound around the stator core 134*a*1. The stator core 134*a*1 is disposed so that the center axis thereof is substantially aligned with the center axis of the stator 134*a*. Note that the center axis of the stator 134*a* and the center axis of the stator core 134*a*1 serve as the axis of the fan rotor 135. Hereinafter, this center axis is referred to as the rotation axis O.

A bolt hole 134*a*4 for fixing the casing 134*e* to the stator 134*a* with a bolt is formed in the outer periphery of the stator 134*a*. The stator 134*a* is fixed to the casing (not illustrated) of the utilization unit 13. The stator 134*a* has a connector 134*a*3 for supplying power to the stator coil 134*a*2. The inverter of the fan motor 134 is connected to the control unit 123 via a data line connected to the connector 134*a*3. The fan motor 134 receives a control signal from the control unit 123 or the fan motor control unit 123*a* via the connector 134*a*3 and the data line.

The rotor 134*b* is a cup-shaped member disposed leaving a predetermined gap on the outer peripheral side of the stator 134*a*. The rotor 134*b* mainly has a flat plate portion 134*b*1, an outer cylinder portion 134*b*2, and a coupling portion 134*b*3.

The flat plate portion 134*b*1 is mainly formed in a substantially disk shape. A circular opening 134*b*5 for installing the coupling portion 134*b*3 is formed in the center of the flat plate portion 28. The opening 134*b*5 is formed at a position where the center is perpendicular to the rotation axis O.

The outer cylinder portion 134*b*2 is formed in a substantially tubular shape extending from the outer periphery of the flat plate portion 134*b*1 toward the stator 134*a* along the rotation axis O. The outer cylinder portion 134*b*2 has a magnetic pole member 134*b*4 that supplies field magnetic flux to the stator 134*a*. The magnetic pole member 134*b*4 faces the outer peripheral surface of the stator coil 134*a*2 with an air gap therebetween.

The coupling portion 134*b*3 is a cylindrical member attached to the opening 134*b*5 of the flat plate portion 134*b*1. The coupling portion 134*b*3 has an outer peripheral surface fixed to the inner peripheral surface of the opening 134*b*5 of the flat plate portion 134*b*1. The shaft 134*c* having a columnar shape is fixed to the inner periphery of the coupling portion 134b3 so that the center axis is aligned with the rotation axis O.

Figure 3:
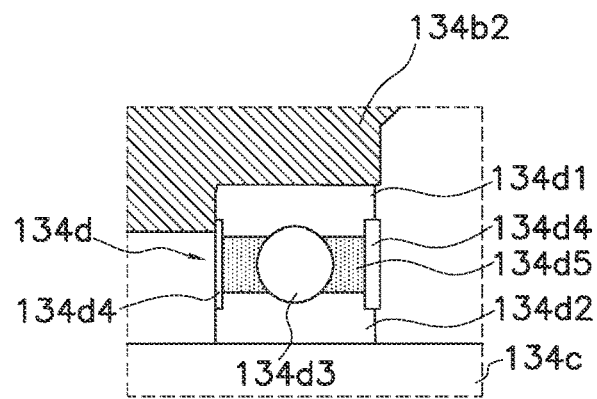
FIG. 3 is an enlarged view of a bearing 134d and the periphery thereof surrounded with a frame A.

The bearings 134d hold the shaft 134c rotatably with respect to the stator 134a. FIG. 3 is an enlarged view of a bearing 134d periphery surrounded with a frame A. The bearing 134d is a ball bearing having an outer ring 134d1, an inner ring 134d2, and a ball 134d3. The outer peripheral surface of the outer ring 134d1 is fitted and fixed to the inner peripheral surface of the stator 134a, and the inner peripheral surface of the inner ring 134d2 is fitted and fixed to the outer peripheral surface of the shaft 134c. The bearing 134d is a sealed bearing having an interior filled with a lubricant 134d5 such as grease. Specifically, a seal member 134d4 for sealing a space in which the ball 134d3 is housed is attached to both ends of the outer ring 134d1 and the inner ring 134d2 in the extension direction of the rotation axis O, and the space is filled with the lubricant 134d5 such as grease. Examples of the lubricant 134d5 include, but are not limited to, urea-based and lithium soap-based greases.

In the fan motor 134, the two bearings 134d support the shaft 134c. The two bearings 134d are aligned on the inner periphery of the stator 134a, with a predetermined gap therebetween in the extension direction of the rotation axis O.

The casing 134e is a cup-shaped member that houses the rotor 134b as well as the stator 134a. The casing 134e has a flat plate portion 134e1 and an outer cylinder portion 134e2.

The flat plate portion 134e1 is mainly formed in a substantially disk shape facing the flat plate portion 134b1 of the rotor 134b. An opening 134e3 for allowing the shaft 134c to pass through is formed in the center of the flat plate portion 134e1. The flat plate portion 134e1 faces the flat plate portion 134b1 of the rotor 134b, with a predetermined gap therebetween.

The outer cylinder portion 134e2 is formed in a substantially tubular shape extending from the outer periphery of the flat plate portion 134e1 toward the stator 134a along the rotation axis O. The outer cylinder portion 134e2 faces the outer cylinder portion 134b2 of the rotor 134b, with a predetermined gap therebetween. The casing 134e has a bolt hole 134e4 at the stator 134a-side end of the outer cylinder portion 134b2. The bolt is fastened to the bolt hole 134a4 of the stator 134a through the bolt hole 134e4, thereby fixing the casing 134e to the stator.

The temperature sensor 134f measures a first temperature T1, which is the temperature of the bearing 134d. Although not limited, a well-known temperature sensor such as a thermistor or a thermocouple is used for the temperature sensor 134f. The temperature sensor 134f is attached to the outer surface of the bearing 134d.

Although not illustrated, the fan rotor 135 is fixed to the end on the opposite side of the shaft 134c from the stator 134a.

(2-2-2) Fan Motor Control Unit

The fan motor control unit 123a rotationally drives the fan motor 134 and acquires the first temperature T1 measured by the temperature sensor 134f, to execute first control. The fan motor control unit 123a basically rotationally drives the fan motor 134 within the rotational speed range or at the required rotational speed indicated by the control unit 123, except during the execution of the first control. The fan motor control unit 123a is an example of a first control unit.

(3) First Control

The first control is to prevent the occurrence of oil film formation defects in the bearing 134d with a lubricant sealed in while reducing the power consumption of the fan motor 134. In the first control, the fan motor control unit 123a decreases the rotational speed of the fan motor 134 when the first temperature T1, which is the temperature of the bearing 134d, decreases during operation in which the fan motor 134 is rotated in the low rotational speed range. More specifically, in the first control, the fan motor control unit 123a decreases the rotational speed of the fan motor 134 by decreasing the lower limit rotational speed of the low rotational speed range.

Figure 4:
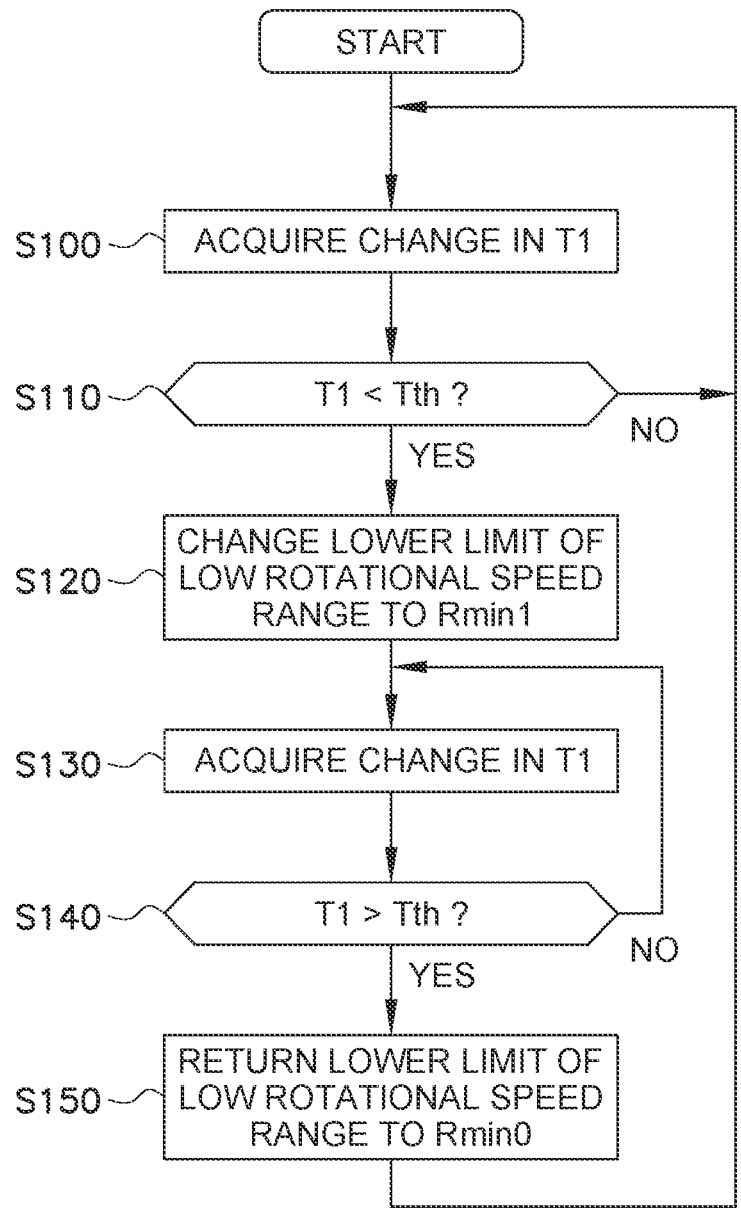
FIG. 4 is a flowchart illustrating first control.

FIG. 4 is a flowchart illustrating the first control. The control flow in FIG. 4 is started when the control unit 123 instructs the fan motor control unit 123a to rotationally drive the fan motor 134 in the low rotational speed range (L-tap). The time when the control unit 123 instructs the fan motor control unit 123a to rotationally drive the fan motor 134 in the low rotational speed range is not limited to when the user selects the L-tap. For example, the control unit 123 may instruct the fan motor control unit 123a to rotationally drive the fan motor 134 in the low rotational speed range during the weak cooling and dehumidifying operation, the reheat dehumidifying operation, the thermo-off operation, or the like.

In step S100, the fan motor control unit 123a acquires the change in the first temperature T1 during a predetermined time Δt1, and proceeds to step S110.

In step S110, upon determining that the first temperature T1 has decreased during the time Δt1 and has become lower than a preset threshold temperature Tth (Yes), the fan motor control unit 123a proceeds to step S120, and upon determining that the first temperature T1 has not become lower than the threshold temperature Tth (No), the fan motor control unit 123a proceeds to step S100. The threshold temperature Tth is, for example, within the range of 30-38° C., inclusive.

In step S120, the fan motor control unit 123a changes the lower limit of the low rotational speed range to a lower limit rotational speed Rmin1, which is lower than a preset lower limit rotational speed Rmin0, and proceeds to step S130. The lower limit rotational speed Rmin1 is also recorded in advance in the storage device of the control unit 123. The lower limit rotational speed Rmin0 is, for example, within the range of 300-500 rpm, inclusive. The lower limit rotational speed Rmin1 is, for example, within the range of 100-290 rpm, inclusive.

In step S130, the fan motor control unit 123a acquires the change in the first temperature T1 during a predetermined time Δt2, and proceeds to step S140.

In step S140, upon determining that the first temperature T1 has risen during the time Δt2 and has become higher than the threshold temperature Tth (Yes), the fan motor control unit 123a proceeds to step S150, and upon determining that the first temperature T1 has not become lower than the threshold temperature Tth (No), the fan motor control unit 123a proceeds to step S130.

In step S150, the fan motor control unit 123a returns the lower limit of the low rotational speed range to the lower limit rotational speed Rmin0, and proceeds to step S100.

This control flow ends when the control unit 123 finishes rotating the fan motor 134 in the low rotational speed range.

(4) Features

(4-1)

The blower 100 includes the fan motor 134 with variable rotational speed and the fan motor control unit 123*a*. The fan motor 134 has the shaft 134*c* supported by the bearing 134*d* with the lubricant 134*d*5 sealed in. The fan motor control unit 123*a* rotationally drives the fan motor 134. During the operation in which the fan motor 134 is rotated in a predetermined low rotational speed range, the fan motor control unit 123*a* executes first control to decrease the rotational speed of the fan motor 134 when the first temperature T1, which is the temperature of the bearing 134*d*, decreases.

In recent years, in the field of blowers or air conditioners using blowers, lower rotational speed of fan motors have been considered for the purpose of reducing power consumption. However, bearings generally have more difficulty in suitably forming an oil film at lower rotational speeds, and fan motors using bearings with lubricant sealed in have limitations in reducing rotational speed.

When the first temperature T1, which is the temperature of the bearing 134*d*, decreases, the fan motor control unit 123*a* of the blower 100 according to the present disclosure decreases the rotational speed of the fan motor 134 accordingly. The lubricant sealed in the bearing has the property that since the viscosity increases as the temperature decreases, so that an oil film is suitably formed. Therefore, at the temperature at which the oil film is suitably formed, the occurrence of oil film formation defects is reduced even if the rotational speed of the fan motor 134 is decreased.

Therefore, the blower 100 can prevent the occurrence of oil film formation defects in the bearing 134*d* with the lubricant 134*d*5 sealed in while reducing the power consumption of the fan motor 134.

(4-2)

In the first control, the fan motor control unit 123*a* decreases the rotational speed of the fan motor 134 by decreasing the lower limit rotational speed of the low rotational speed range.

The blower 100 can prevent the occurrence of oil film formation defects in the bearing 134*d* with the lubricant 134*d*5 sealed in while reducing the power consumption of the fan motor 134 by the simple control of decreasing the lower limit rotational speed of the low rotational speed range.

(4-3)

The fan motor control unit 123*a* decreases the rotational speed of the fan motor 134 to or below the lower limit of the user-selectable rotational speed range (fan tap) of the fan motor 134 in the first control.

In the blower 100, the fan motor control unit 123*a* can decrease the rotational speed of the fan motor 134 below the lower limit rotational speed of the rotational speed range selectable by the user using the remote controller 130. Therefore, the power consumption of the fan motor 134 can be effectively reduced.

(4-4)

The blower 100 includes the temperature sensor 134*f* that measures the first temperature T1. The temperature sensor 134*e* is attached to the bearing 134*d*.

The blower 100 can acquire the first temperature T1 by the temperature sensor 134*f* attached to the bearing 134*d*. Therefore, by accurately acquiring the temperature of the bearing 134*d*, the rotational speed of the fan motor 134 can be effectively reduced to reduce power consumption.

(5) Modifications

(5-1) Modification 1A

In the control flow illustrated in FIG. 4, upon determining that the first temperature T1 has decreased to be lower than the threshold temperature Tth, the fan motor control unit 123*a* changes the lower limit of the low rotational speed range to the lower limit rotational speed Rmin1, but the timing of changing the lower limit of the low rotational speed range is not limited thereto.

In the first control, the fan motor control unit 123*a* according to Modification 1A decreases the rotational speed of the fan motor 134 if the amount of change in the first temperature T1 for a predetermined period D1 after the first temperature T1 decreases below the threshold temperature Tth falls within a predetermined temperature range ΔT.

Figure 5:
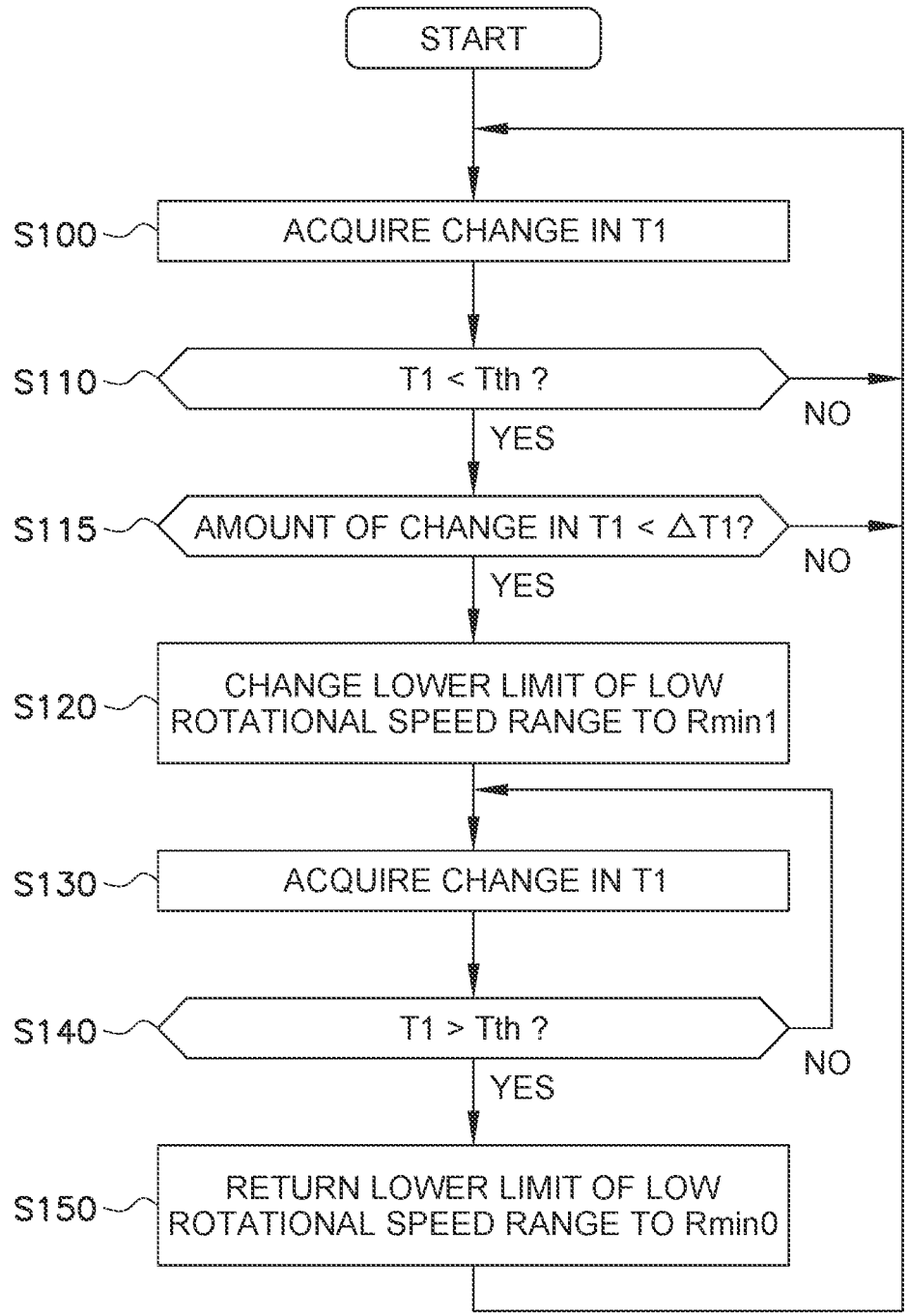
FIG. 5 is a flowchart illustrating first control executed by a fan motor control unit 123a according to Modification 1A.

FIG. 5 is a flowchart illustrating the first control executed by the fan motor control unit 123*a* according to Modification 1A. The main difference between the flowchart in FIG. 4 and the flowchart in FIG. 5 is that the flowchart illustrated in FIG. 5 has step S115.

Hereinafter, differences will be mainly described.

In step S110, upon determining that the first temperature T1 has decreased during the time Δt1 and has become lower than the preset threshold temperature Tth (Yes), the fan motor control unit 123*a* proceeds to step S115, and upon determining that the first temperature T1 has not become lower than the threshold temperature Tth (No), the fan motor control unit 123*a* proceeds to step S100.

In step S115, upon determining that the amount of change in the first temperature T1 for the predetermined period D1 after the first temperature T1 decreases below the threshold temperature Tth falls within the predetermined temperature range ΔT (Yes), the fan motor control unit 123*a* proceeds to step S120, and upon determining that the change amount is not within the temperature range ΔT (No), the fan motor control unit 123*a* proceeds to step S100.

Thus, the fan motor control unit 123*a* changes the lower limit of the low rotational speed range after the first temperature T1 decreases and stabilizes within the temperature range ΔT. Therefore, the occurrence of the hunting phenomenon in which the rotational speed of the fan motor 134 repeatedly falls and rises is reduced.

(5-2) Modification 1B

The fan motor control unit 123*a* may prioritize the first control over the required rotational speed instruction from the control unit 123. Specifically, during the first control, the fan motor control unit 123*a* gives priority to changing to the lower limit rotational speed Rmin1 if the required rotational speed instruction from the control unit 123 is less than the lower limit rotational speed Rmin1.

As described above, the fan motor control unit 123*a* indicates the required rotational speed on the basis of the measurement values of the various sensors and the like during the air conditioning operation, but if the control unit 123 indicates a required rotational speed less than the lower limit rotational speed Rmin1 during the execution of the first control, the fan motor control unit 123a continues the first control and executes step S120 described above.

(5-3) Modification 1C

The fan motor control unit 123a may control the rate of decrease in the rotational speed of the fan motor 134 after changing the lower limit rotational speed Rmin0 to the lower limit rotational speed Rmin1 in step S120 of the first control.

Specifically, in the blower 100 according to Modification 1C, the rate of decrease in the rotational speed of the fan motor 134 in the first control is set so that the temperature rise of the utilization-side heat exchanger 132 in the first control is equal to or lower than a predetermined second temperature T2. After changing the lower limit rotational speed Rmin0, the fan motor control unit 123a decreases the rotational speed of the fan motor 134 according to a preset decrease rate.

As a result, it is possible to suppress a sudden increase in high pressure due to a decrease in the rotational speed of the fan motor 134 after the change of the lower limit rotational speed Rmin0.

In addition, after changing the lower limit rotational speed Rmin0 to the lower limit rotational speed Rmin1 in step S120 of the first control, the fan motor control unit 123a may decrease the rate of decrease in the rotational speed of the fan motor 134 in stages.

(5-4) Modification 1D

The fan motor control unit 123a may control the rate of increase in the rotational speed of the fan motor 134 after the first control is completed.

Specifically, in the blower 100 according to Modification 1D, the absolute value of the rate of increase in the rotational speed of the fan motor 134 after the first control is completed is set to be greater than the absolute value of the rate of decrease in the rotational speed of the fan motor 134 after the lower limit rotational speed Rmin0 is changed to the lower limit rotational speed Rmin1 in step S120.

As a result, if the first temperature T1 becomes higher than the threshold temperature Tth, it is possible to prevent the occurrence of oil film formation defects in the bearing 134d due to the operation in the low rotational speed region, by quickly increasing the rotational speed of the fan motor 134. Therefore, the protection of the fan motor 134 can be prioritized over the reduction of power consumption.

(5-5) Modification 1E

In the blower 100, the temperature sensor 134f is provided on the bearing 134d, but the temperature sensor 134f may be installed in other locations where the temperature around the bearing 134d can be measured as the first temperature T1.

Figure 6:
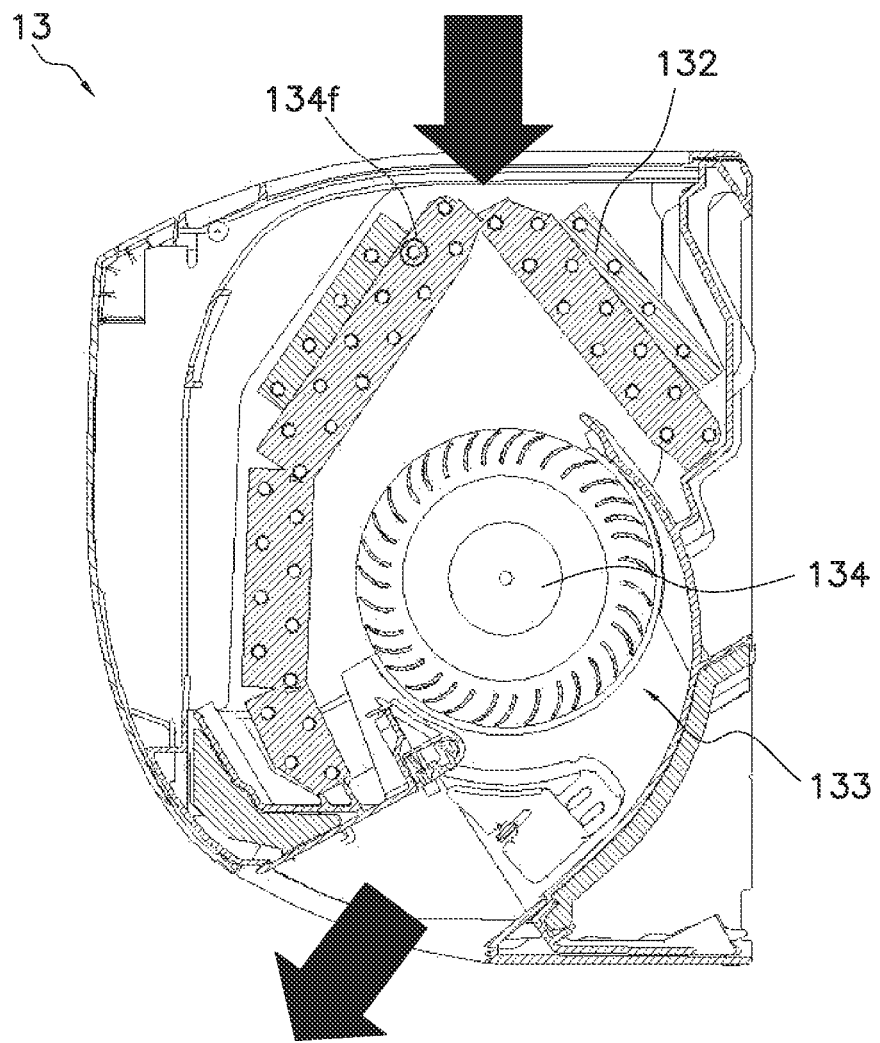
FIG. 6 is a sectional view illustrating the air flow in a wall-mounted utilization unit 13 using a cross-flow fan.
Figure 7:
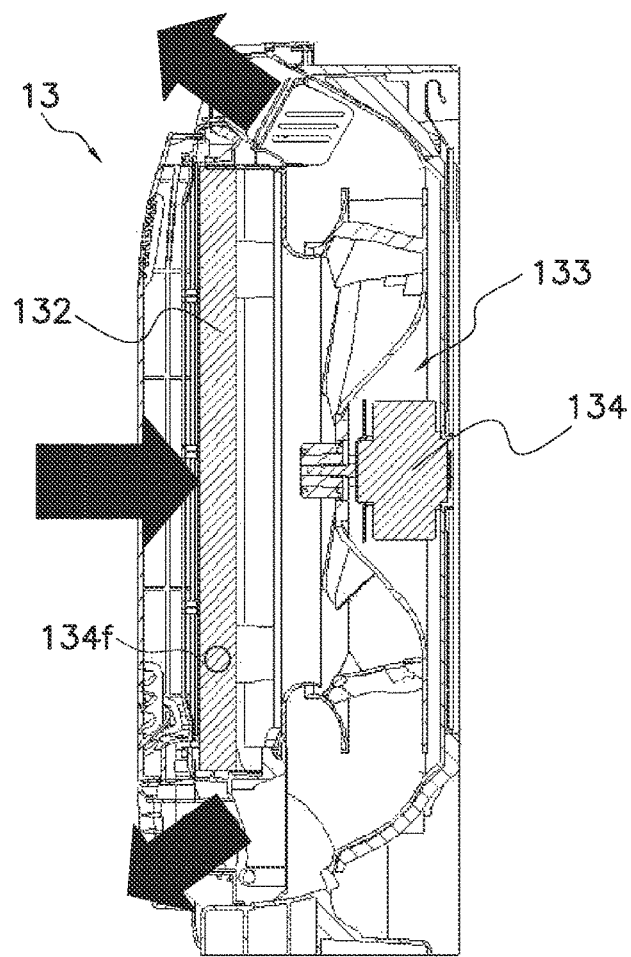
FIG. 7 is a sectional view illustrating the air flow in a floor-standing utilization unit 13 using a turbo fan.

For example, if the utilization unit 13 is of a wall-mounted type using a cross-flow fan as the utilization-side fan 133 or of a floor-standing type using a turbo fan as the utilization-side fan 133, the air having passed through the utilization-side heat exchanger 132 passes around the fan motor 134. FIG. 6 is a sectional view illustrating the air flow in a wall-mounted utilization unit 13 using a cross-flow fan, indicated by arrows. FIG. 7 is a sectional view illustrating the air flow in a floor-standing utilization unit 13 using a turbo fan, indicated by arrows.

In these utilization units 13, since a large difference hardly occurs between the temperature of the air measured by the utilization-side heat exchanger 132 and the temperature of the bearing 134d of the fan motor 134, the temperature sensor 134f that measures the temperature of the utilization-side heat exchanger 132 can be used to measure the first temperature T1.

Figure 8:
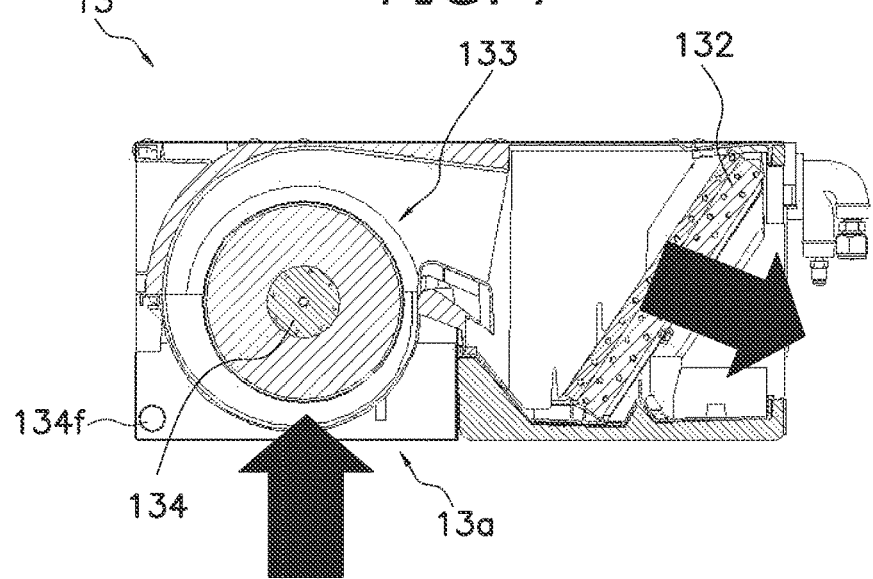
FIG. 8 is a sectional view illustrating the air flow in a ceiling-embedded utilization unit 13 using a sirocco fan.

In addition, if the utilization unit 13 is of a ceiling-embedded type using a sirocco fan as the utilization-side fan 133, the air passing around the fan motor 134 passes through the utilization-side heat exchanger 132. FIG. 8 is a sectional view illustrating the air flow in a ceiling-embedded utilization unit 13 using a sirocco fan, indicated by arrows.

In the utilization unit 13, since a large difference hardly occurs between the temperature of the air measured at the suction port 13a of the utilization unit 13 and the temperature of the bearing 134d of the fan motor 134, the temperature sensor 134f that measures the temperature of the air at the suction port 13a can be used to measure the first temperature T1.

Note that if the temperature sensor 134f is used to measure the temperature around the bearing 134d, a value obtained by adding a predetermined correction factor to the measured temperature may be used as the first temperature T1. For example, if the measured value of the temperature sensor 134f attached to the utilization-side heat exchanger 132 is used, a value obtained by adding 2.5° C. to the measured temperature can be set as the first temperature T1.

(5-6) Modification 1F

In the above description, the bearing 134d of the fan motor 134 of the utilization-side fan 133 is an object to be controlled by the first control, but the fan motor 115a of the heat source-side fan 115 of the heat source unit 12 may alternatively be an object to be controlled by the first control.

Figure 9:
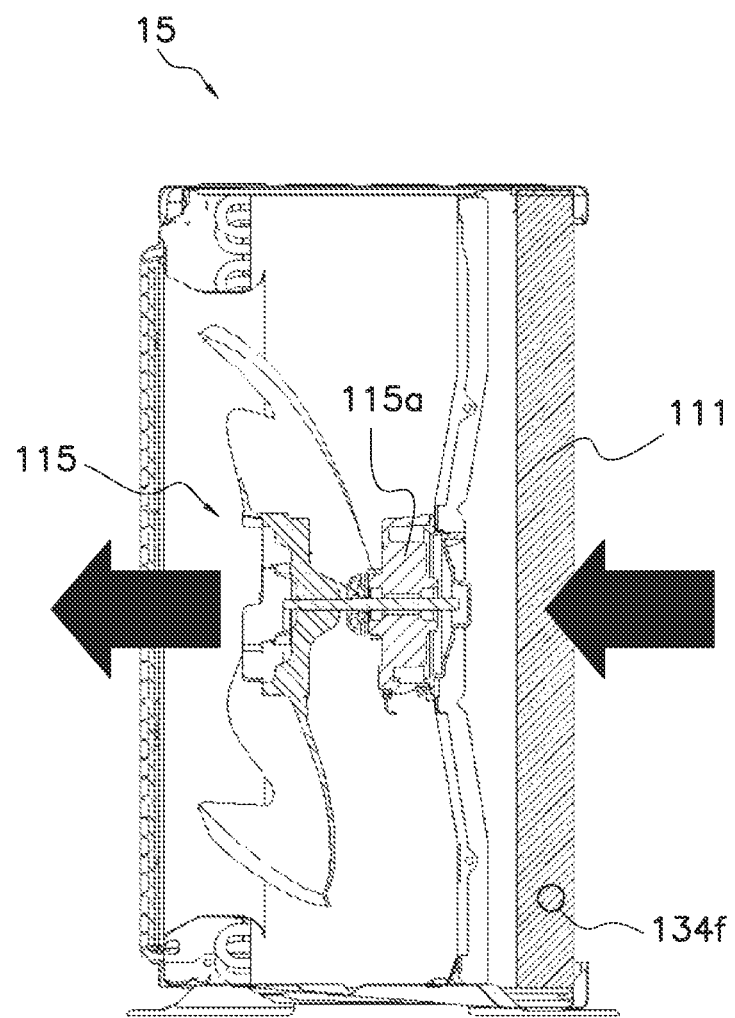
FIG. 9 is a sectional view illustrating the air flow in a heat source unit 12 using a propeller fan.

If the heat source unit 12 uses a propeller fan as the heat source-side fan 115, the air that has passed through the heat source-side heat exchanger 111 passes around the fan motor 115a. FIG. 9 is a sectional view illustrating the air flow in the heat source unit 12 using a propeller fan, indicated by arrows.

In the heat source unit 12, since a large difference hardly occurs between the temperature of the air measured by the heat source-side heat exchanger 111 and the temperature of the bearing of the fan motor 115a, the temperature sensor 134f that measures the temperature of the heat source-side heat exchanger III can be used to measure the first temperature T1.

The embodiment of the present disclosure has been described above. It will be understood that various changes to modes and details can be made without departing from the spirit and scope of the present disclosure recited in the claims.

REFERENCE SIGNS LIST

1: air conditioner
12: Heat Source Unit
13: utilization unit (indoor unit)
123: control unit (second control unit)
123a: fan motor control unit (first control unit)
132: utilization-side heat exchanger
133: utilization-side fan
134: fan motor (motor)

134c: shaft
134d: bearing
134d5: lubricant
134f: temperature sensor
100: blower
T1: first temperature
T2: second temperature
D1: period
ΔT: temperature range

CITATION LIST

Patent Literature

Patent Literature 1: JP 2017-067046 A

The invention claimed is:

1. A blower comprising:
a motor with variable rotational speed, having a shaft that is supported by a bearing with a lubricant sealed inside; and
a first controller that rotationally drives the motor,
wherein
the first controller executes a first control to decrease the rotational speed of the motor when a first temperature (T1) decreases during operation in which the motor is rotated in a predetermined low rotational speed range, the first temperature (T1) being a measured or calculated temperature of the bearing.

2. The blower according to claim 1, wherein the first controller decreases the rotational speed of the motor by decreasing a lower limit rotational speed of the low rotational speed range, in the first control.

3. The blower according to claim 2, wherein the first controller decreases the rotational speed of the motor to or below a user-selectable rotational speed of the motor, in the first control.

4. The blower according to claim 2, wherein the first controller decreases the rotational speed of the motor in a case that an amount of change in the first temperature falls within a predetermined range (ΔT) for a predetermined period (D1) after the first temperature (T1) decreases, in the first control.

5. The blower according to claim 2, further comprising a temperature sensor that measures the first temperature (T1),
wherein the temperature sensor is attached to the bearing.

6. An air conditioner comprising:
an indoor unit having the blower according to claim 2, a temperature sensor that measures the first temperature (T1), and a heat exchanger; and
a second controller that controls the blower to perform air conditioning in a space to be air-conditioned in which the indoor unit is installed.

7. The blower according to claim 1, wherein the first controller decreases the rotational speed of the motor to or below a user-selectable rotational speed of the motor, in the first control.

8. The blower according to claim 7, wherein the first controller decreases the rotational speed of the motor in a case that an amount of change in the first temperature falls within a predetermined range (ΔT) for a predetermined period (D1) after the first temperature (T1) decreases, in the first control.

9. The blower according to claim 7, further comprising a temperature sensor that measures the first temperature (T1),
wherein the temperature sensor is attached to the bearing.

10. An air conditioner comprising:
an indoor unit having the blower according to claim 3, a temperature sensor that measures the first temperature (T1), and a heat exchanger; and
a second controller that controls the blower to perform air conditioning in a space to be air-conditioned in which the indoor unit is installed.

11. The blower according to claim 1, wherein the first controller decreases the rotational speed of the motor in a case that an amount of change in the first temperature falls within a predetermined range (ΔT) for a predetermined period (D1) after the first temperature (T1) decreases, in the first control.

12. The blower according to claim 11, further comprising a temperature sensor that measures the first temperature (T1),
wherein the temperature sensor is attached to the bearing.

13. The blower according to claim 1, further comprising a temperature sensor that measures the first temperature (T1),
wherein the temperature sensor is attached to the bearing.

14. An air conditioner comprising:
an indoor unit having the blower according to claim 1, a temperature sensor that measures the first temperature (T1), and a heat exchanger; and
a second controller that controls the blower to perform air conditioning in a space to be air-conditioned in which the indoor unit is installed.

15. The air conditioner according to claim 14, wherein
the second controller controls the blower by instructing the first controller on a required rotational speed of the motor, and
the first controller prioritize the first control over the required rotational speed instruction from the second controller.

16. The air conditioner according to claim 14, wherein a rate of decrease in the rotational speed of the motor in the first control is set so that a temperature of the heat exchanger in the first control is set to be equal to or lower than a predetermined second temperature (T2).

17. The air conditioner according to claim 16, wherein an absolute value of a rate of increase in the rotational speed of the motor after the first control is completed is greater than an absolute value of the rate of decrease in the rotational speed of the motor in the first control.

18. The air conditioner according to claim 14, wherein the rotational speed of the motor in the first control is decreased in stages.

19. The air conditioner according to claim 14, wherein the temperature sensor is attached to the heat exchanger.

20. The air conditioner according to claim 14, wherein the temperature sensor is attached to a suction port of the indoor unit.

* * * * *

UNITED STATES PATENT AND TRADEMARK OFFICE
CERTIFICATE OF CORRECTION

PATENT NO. : 12,066,207 B2
APPLICATION NO. : 18/384478
DATED : August 20, 2024
INVENTOR(S) : Akihiro Nakano et al.

It is certified that error appears in the above-identified patent and that said Letters Patent is hereby corrected as shown below:

On the Title Page

Item (54) and In the Specification, Column 1, Lines 1-2:
Change:
"BLOWER AND WITH CONTROLLER CONTROLLING A MOTOR"
To:
--BLOWER WITH CONTROLLER CONTROLLING A MOTOR--

Signed and Sealed this
Twenty-sixth Day of November, 2024

Katherine Kelly Vidal
*Director of the United States Patent and Trademark Office*